Dec. 15, 1936.  J. KANTOR  2,064,378
BOTTLE FILLER SNIFTER
Filed July 2, 1934
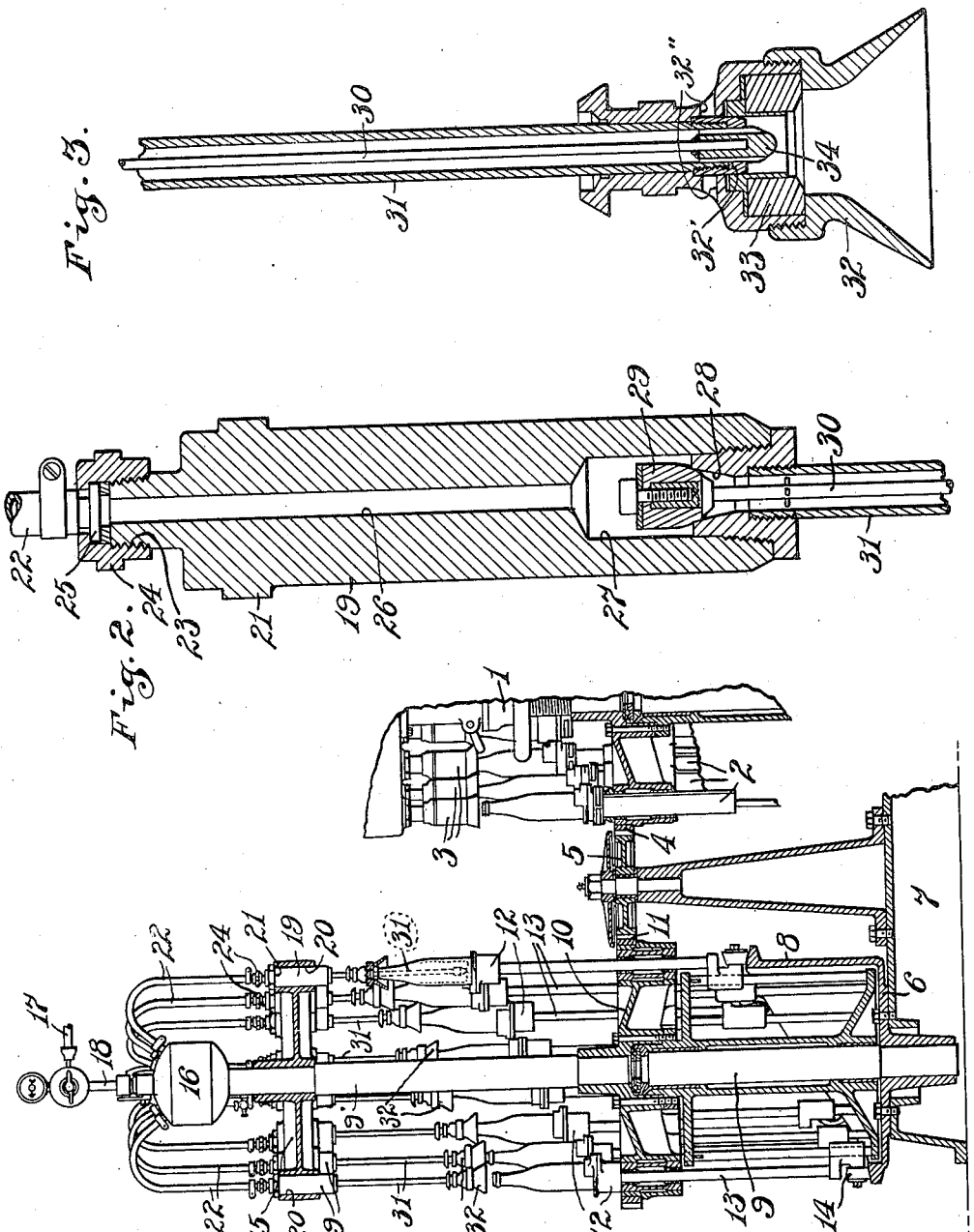
INVENTOR
James Kantor,
BY Hood + Hahn
ATTORNEYS Patented Dec. 15, 1936

2,064,378

UNITED STATES PATENT OFFICE 2,064,378

BOTTLE FILLER SNIFTER

James Kantor, Chicago, Ill., assignor to The Liquid Carbonic Corporation, Chicago, Ill., a corporation of Delaware Application July 2, 1934, Serial No. 733,345

5 Claims. (Cl. 226—68)

My invention relates to improvements in bottle filling machines and has particular reference to the preparation of the bottle prior to the filling of the same with beverage. Air is detrimental to many of the beverages with which bottles are filled, and is, in fact, as detrimental to almost any food product. It has been found that air in bottles which are filled with beer has a tendency to deteriorate, not only as to color, but as to taste and it is one of the objects of my invention to provide means for driving out or exhausting the air from the bottles prior to their being filled. This is preferably accomplished by the admission to the bottle, prior to its delivery to the filling machine, of $CO_2$ which is allowed to flow into the bottle under very low pressure, and being considerably heavier than air, drives the air out of the bottle.

For the purpose of disclosing my invention, I have illustrated an embodiment thereof in the accompanying drawing, in which Fig. 1 is a side elevation partly in section of an apparatus for delivering $CO_2$ to a bottle immediately prior to the delivery of the same to the filling machine;

Figs. 2 and 3 are sectional views respectively of the upper and lower portions of the snifter valve.

In the embodiment of the invention illustrated, there is provided a filling machine 1 adapted to fill a bottle with the desired beverage, which is provided with a plurality of vertically reciprocating bottle receiving seats 2 and with a plurality of filling nozzles or valves 3 adapted to cooperate with the bottle holders or seats 2 and deliver the beverage to the bottle as the structure rotates. This rotating filler is provided at its periphery with a driving gear 4 which, through the instrumentality of an idler gear 5, drives the "snifter".

The snifter comprises a base portion 6 mounted on the same base 7 which carries the filling machine and this base portion has an annular cam member 8. Extending upwardly from the base portion is a center spindle 9 on which is rotatably mounted a bottle carrier 10 which carrier is provided with a gear 11 meshing with the gear 5. This carrier is provided with a plurality of reciprocating bottle supports 12 mounted on stems 13 reciprocable in the carrier and provided at their lower ends with rollers 14 adapted to engage the cam member 8 and raise the bottle from its lowermost position, as shown at the left of the snifter, to the highermost position, as shown to the right of the snifter.

At the upper end of a center post 9' extending upwardly from the carrier 10 and rotating therewith is a snifter valve carrier 15 which rotates with the bottle supports 12 and carries a plurality of snifter valves, one for each bottle carrier. These valves are reciprocably mounted in the carrier 15 and are adapted to receive $CO_2$ from the gas reservoir 16 mounted on the top of the center post 9' which in turn is supplied with gas under pressure from a suitable supply line 17. This reservoir, like the snifter valve, rotates with the center post 9' and has a rotatable connection with the supply pipe 18 extending from the supply line 17.

Each of the snifter valves comprises a reciprocable member 19, preferably cylindrical, supported in a socket 20 on the carrier 15. The upper end of this reciprocable member is provided with an annular shoulder 21 to limit the downward movement thereof. The upper end of this reciprocable valve member is connected by a flexible pipe 22 with the gas reservoir 16 and to this end the upper end of the member 19 has a screw threaded ferrule 23 adapted to receive a nut 24 clamping over an annular shoulder 25 on the end of the pipe 22 and thereby clamping the end of the pipe securely against the end of the ferrule.

A central opening 26 extends through the reciprocable member, which opening on the lower end of the member enlarged as at 27 to provide a valve chamber. The lower end of this opening is closed by a valve seat 28 secured into the lower end of the enlarged portion 27 by screw threads and cooperating with this valve seat is a filler valve 29 secured on the upper end of a stem 30. This valve seat member 28 has extending downwardly therefrom a delivery pipe 31 which terminates at its lower end in a bottle receiving throat 32 within which is arranged a sealing cushion 33.

This throat 32 is slidable relative to the delivery pipe 31, being limited in its lowermost position by a stop nut 32' secured on the lower end of the tube or pipe 31 so that while the throat may move upwardly on the pipe it cannot move off the pipe at its lowermost position and is provided with a plurality of transverse openings 32" which, when the throat is raised, permits the escape of air from the bottle as the $CO_2$ is admitted.

The stem 30 extends downwardly through this tube 31 terminating at its lower end in a tip 34 which is of just sufficient diameter to fill the tube 31 and thus acts as a guide for the lower end of the stem. This tip has a plurality of longitudinally extending channels therein permitting the passage of the gas from the tube 31 past the tip and into the bottle.

In operation, the bottles are raised on their seats 12 to move their necks into the throat 32 and into contact with the cushion seat 33. This raising movement of the bottles likewise raises the throat which, being slidably mounted on the tube 31, permits a movement of the throat relatively to the tube so that eventually the bottom end of the tube and with it the, now exposed, tip 34, reach the bottom of the bottle. The continued upward movement of the bottle when the tip 34 engages the bottle raises the stem 30 thereby unseating the valve 29 and admitting the $CO_2$ to the bottle, at the bottom thereof. It is important that the gas should be delivered as near the bottom of the bottle as possible so that the incoming gas first strikes the bottom of the bottle and thus flows upwardly thus forcing all air out of the bottle. If the tube were to enter only part way down into the bottle, after the gas valve is opened, the $CO_2$ would tend to mix with the air in the bottle and the air would not be as completely exhausted from the bottle.

I have found that by admitting the $CO_2$ under a pressure of about one and a half to two pounds the most desirable results are obtained because the admission of the gas at a low velocity minimizes the possibility of mixing the gas with the air.

The continued rotation of the roller on the cam 8 will result in the eventual lowering of the bottle, closing the valve 29, and by this time the bottle is in a position to be delivered to the bottle-receiver 2 of the filler.

As the bottle is rotated on the filler it is raised into contact with the filling valve 3 and the beverage admitted to the bottle.

It will be noted that the tube 31 is of such length that by the time the bottle has reached the uppermost limit of its stroke and its bottom thereby engages and raises the tip 34, there is still a slight clearance between the bottom of the tube and the bottom of the bottle so that there will be room for the passage out from the tube of the gas, the arrangement being such, however, that the gas is delivered on the bottom of the bottle and rises upwardly forcing the air out above the same. I have found from actual experience that this method of delivering the gas to the bottle results in between 95 and 97 percent purity of gas in the bottle, whereas, with the gas delivered at points above the bottom of the bottle this purity is decreased to as much as, under some circumstances, 50 percent purity.

Furthermore, by mounting the member 19 in the support 15 so that it can reciprocate, the delivery tube is loosely mounted so that in event the bottle, from any cause, should not be properly centered with respect to the tube 31, and the tube could not project into the bottle, the whole snifter valve could rise bodily, thus preventing the breaking of the bottle or the distortion of the tube and its associated parts.

I claim as my invention:

1. In a container filling machine, the combination, with a rotating filling machine including a plurality of reciprocating container supports, a filler valve associated with each of said supports and arranged to deliver liquid into said containers, of a means for filling the containers with $CO_2$ prior to their delivery to the filling machine, comprising a plurality of reciprocating container supporting members rotating about a common axis, and rotatably driven from said filling machine, and a delivery tube associated with each of said supports adapted to be projected into the container close to the bottom of the container by the reciprocation of the support, a valve at the inlet end of said tube for controlling the admission of gas to said tube and means at the bottom end of said tube engaged by the bottom of the container for controlling said valve.

2. In a machine for filling containers with $CO_2$ prior to their delivery to a filling machine, the combination, with a reciprocating container support, of a head, a valve body, reciprocably supported on said head, a delivery tube supported from said body, a valve in said body controlling the admission of gas to said tube, said reciprocating support being adapted to project said tube into the container in close proximity to the bottom thereof and means at the lower end of said tube engaging the bottom of the container for controlling said valve.

3. In a machine for delivering $CO_2$ to a container prior to its delivery to a filling machine, the combination, with a reciprocating container support, of a head, a valve body reciprocably mounted in said head, a valve in said body, a delivery tube extending downwardly from said body, said valve controlling the admission of gas into said tube, the reciprocation of said support projecting said tube into the container in close proximity to the bottom of the container, a sealing head for the container, slidingly mounted on said tube, and means at the bottom of said tube adapted to be engaged by the bottom of the container for controlling said valve.

4. In a container filling machine, the combination with a filling machine for delivering the container contents thereto, of means for initially discharging into the container a supply of $CO_2$ to completely fill the container prior to the delivery of the container to the filling machine comprising a traveling container supporting conveyor, a single tube moving with said conveyor, connected with a supply of $CO_2$ and insertable in the container with the delivery end thereof in close proximity to the bottom of the container and a valve operating member at the lower end of the tube operated by contact with the bottom of the container, said tube and operating member comprising the sole means inserted in the container at the time of the delivery of said $CO_2$ and said tube being sufficiently spaced from the walls of the neck of the container to permit the escape of the air contained in the container through said neck as the $CO_2$ is being delivered to the bottom of the container.

5. In a machine for filling containers with $CO_2$ prior to their delivery to a filling machine, the combination with a reciprocal container support, of a head, a delivery tube reciprocably supported by said head, a valve controlling the admission of gas to said tube, said reciprocating support being adapted to project said tube into the container in close proximity with the bottom thereof, and means at the lower end of the tube engaging the bottom of the container for controlling said valve.

JAMES KANTOR.